US011226773B1

(12) United States Patent
Patel et al.

(10) Patent No.: US 11,226,773 B1
(45) Date of Patent: Jan. 18, 2022

(54) WORKLOAD MANAGEMENT IN NETWORKED STORAGE SYSTEMS

(71) Applicant: International Business Machines Corporation, Armonk, NY (US)

(72) Inventors: Kushal S. Patel, Pune (IN); Subhojit Roy, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/061,677

(22) Filed: Oct. 2, 2020

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 3/067* (2013.01); *G06F 3/0647* (2013.01); *G06F 3/0664* (2013.01)

(58) Field of Classification Search
CPC .. G06F 3/0652; G06F 12/023; G06F 12/0246; G06F 12/0253; G06F 12/0862; G06F 12/0866; G06F 16/164; G06F 2212/1024; G06F 2212/283; G06F 2212/7202; G06F 2212/7205; G06F 30/367; G06F 3/0608; G06F 3/061; G06F 3/0611; G06F 3/0631; G06F 3/0643; G06F 3/0646; G06F 3/0659; G06F 3/0679; G06F 3/0689
See application file for complete search history.

(56) References Cited

U.S. PATENT DOCUMENTS

2019/0303308 A1 10/2019 Knauft
2019/0332276 A1 10/2019 Gupta
2019/0334982 A1 10/2019 Mallick

OTHER PUBLICATIONS

Disclosed Anonymously et al., "Responsibility-based I/O Prioritization in Port-Sharing Storage Systems", An IP.com Prior Art Database Technical Disclosure, IP.com No. IPCOM000259695D, IP.com Electronic Publication Date: Sep. 8, 2019, 6 pages.

*Primary Examiner* — Yong J Choe
(74) *Attorney, Agent, or Firm* — Stephen R. Yoder

(57) ABSTRACT

Managing workloads at the processor core level by identifying host-to-core relationships and corresponding virtual machines of a host cluster. NVMe-oF protocols provide for communications between host cluster and target storage over a network. I/O queues and corresponding physical hosts are evaluated for intra-cluster migration of VMs to relieve processor core overload and underutilization. A VM migration plan is implemented by host cluster hypervisors.

20 Claims, 4 Drawing Sheets

WORKLOAD MANAGEMENT IN NETWORKED STORAGE SYSTEMS

BACKGROUND

The present invention relates generally to the field of storage systems, and more particularly to processor core workload management.

NVMe (non-volatile memory express) is a storage protocol that is designed for fast data transfer between servers, storage devices, and flash controllers that typically use PCIe (peripheral component interconnect express) bus. The specification of NVMe provides a register interface and a command set that enabled high performance I/O (input/output). This is an alternative to the traditional SCSI (small computer system interface) standards (and other standards such as SAS and SATA) for data transmission across the hosts and storage systems. NVMe supports parallel I/O processing with multicore servers that results in faster I/O dispensation that leads to reduction in I/O latency. Additionally, NVMe is designed to use fewer CPU (central processing unit or, simply, processor) instructions per I/O. NVMe also supports 64,000 commands in a single message queue and a maximum of 65,535 I/O queues (IOQs).

NVMe over Fabrics (NVMe-oF) including fibre channel (FC-NVMe) is an extension to local PCIe NVMe that allows benefits of NVMe such as high-performance and low-latency across network fabrics. Servers and storage devices can be connected over ethernet network or fiber channel. Both interconnects support NVMe commands over the fabric to extend the advantages of NVMe protocol to interconnected system components. The stated design goal for NVMe-oF was to add no more than 10 microseconds of latency for communication between an NVMe host computer and a network-connected NVMe storage devices, on top of the latency associated with accessing a PCIe NVMe storage.

SUMMARY

In one aspect of the present invention, a method, a computer program product, and a system for balancing I/O queue processing resources of a data storage system communicating with a clustered host processing system using non-volatile memory express (NVMe) protocols includes: (i) detecting an imbalance condition among a set of processor cores of a data storage system; (ii) identifying a set of overloaded processor cores; (iii) determining a set of I/O queues of the overloaded processor cores causing the imbalance condition; (iv) identifying for each I/O queue in the set of I/O queues a corresponding host and a peer physical host based on configuration maps and tables; (v) identifying a set of target I/O queues, the set of target I/O queues associated with a peer physical host connected with a clustered host processing system; (vi) collecting a set of associated workloads and a measure of processor core consumption for each target I/O queue and corresponding processor cores; (vii) generating a virtual machine migration plan to balance the set of associated workloads within the clustered host processing system, the migration plan including moving a virtual machine from a first host connected to underutilized processor cores to a second host connected to overloaded processor cores; and (viii) causing the clustered host processing system to perform the virtual machine migration plan if a migration policy permits the migration.

DETAILED DESCRIPTION

Figure 1:
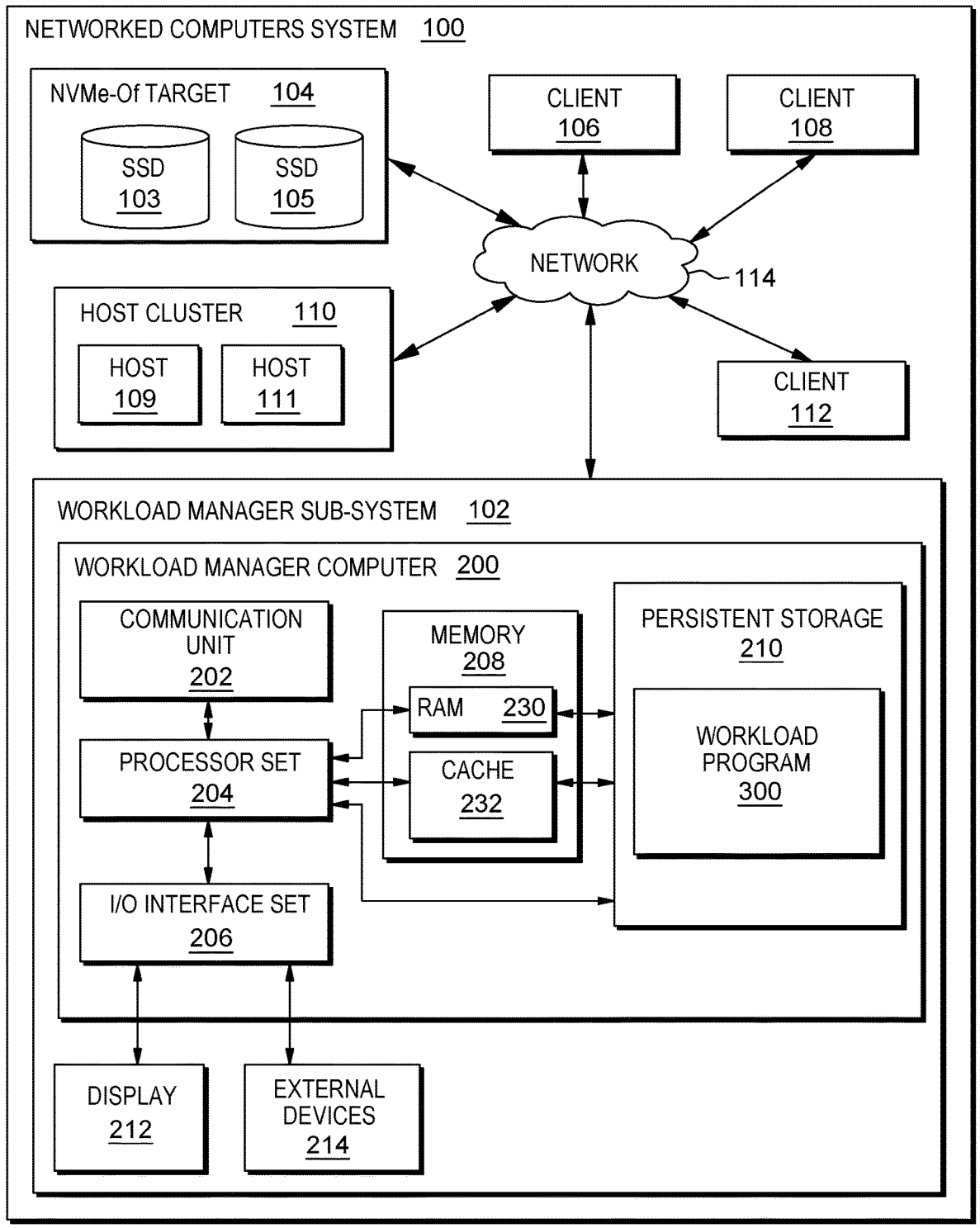
FIG. 1 is a schematic view of a first embodiment of a system according to the present invention.

Some embodiments of the present invention are directed to managing workloads at the processor core level by identifying host-to-core relationships and corresponding virtual machines of a host cluster. NVMe-oF protocols provide for communications between host cluster and target storage over a network. I/O queues and corresponding physical hosts are evaluated for intra-cluster migration of VMs to relieve processor core overload and underutilization. A VM migration plan is implemented by host cluster hypervisors. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: workload manager sub-system 102; target storage sub-system 104; solid state drives 103, 105; client sub-systems 106, 108, 112; host cluster 110; host sub-systems 109, 111; communication network 114; workload manager computer 200; communication unit 202; processor set 204; input/output (I/O) interface set 206; memory device 208; persistent storage device 210; display device 212; external device set 214; random access memory (RAM) devices 230; cache memory device 232; and workload program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Workload program 300 operates to manage workloads at the processor core level by identifying host-to-core relationships and corresponding virtual machines of a host cluster. NVMe-oF protocols provide for communications between host cluster and target storage over a network. I/O queues and corresponding physical hosts are evaluated for intra-cluster migration of VMs to relieve processor core overload and underutilization. A VM migration plan is implemented by host cluster hypervisors.

Some embodiments of the present invention recognize the following facts, potential problems and/or potential areas for improvement with respect to the current state of the art: (i) NVMe-based PCIe Flash over SAS and SATA-based SSDs (solid state drives) provides reduced latency of access in the host software stack, leading to higher input/output operations per second (IOPS) and lower CPU utilization; (ii) because there are multiple cores processing I/O requests simultaneously for NVMe storage, computing system performance increases due to optimal utilization of CPU resources; and/or (iii) there is need to provide a way to consider CPU core overload in the host cluster for trigger a distribution of virtual machines (VMs) based on the observed I/O workloads at the NVMe target subsystem level.

NVMe-oF supports multiple I/O queues for regular I/O operation from host to storage systems. A maximum of around 65,000 queues are supported by NVMe with 64,000 entries in each queue. It is host driver's responsibility to create queues once the connection is established. Once the host is connected to the target system, a special purpose queue is created upon association, i.e. the admin queue (AQ). As the name suggests, the admin queue is used to transfer control commands from initiator to the target device. Once the admin queue is created, this is used by a host to create I/O queues based on system requirements. The host may establish multiple I/O queues to a single controller with the same NVMe qualified names (NQN) and have multiple namespace (or volumes) mapped to it. Once I/O queues are established, I/O commands are submitted to the I/O submission queue (SQ) and I/O responses are collected from the I/O completion queue (CQ). These I/O queues can be added or removed using control instruction sent via the admin queue for that sessions.

When a command is received on the target device for I/O queue (IOQ) creation, it performs initial system checks for maximum supported I/O queues and other relevant fields. It creates an I/O queue and assigns the I/O queue to a CPU core on the storage controller. Once complete, a response to the queue creation request is returned via the I/O completion queue. Each I/O queue is assigned to a different CPU core on the storage controller allowing for parallelism to boost throughput of the system. Core assignment logic is implemented at the target storage controller. The I/O queue-to-core mapping is performed based on a predefined policy at the storage controller.

A host cluster is defined as a group of logical host objects that can be managed together. A host object is a logical object that represents a list of worldwide port names (WWPNs), NQNs, or iSCSI or iSER names that identify the interfaces that the host system uses to communicate with the system. Fibre Channel connections or Fibre Channel over Ethernet use WWPNs to identify host interfaces to the system. iSCSI or iSER names can be either iSCSI qualified names (IQNs) or extended unique identifiers (EUIs). NQNs are used to identify hosts that use FC-NVMe connections. In typical datacenters, multiple hosts are coupled together, and host clusters are created. The host cluster is collectively managed together and used to serve advanced features such as host-level high availability and disaster recovery mechanisms. Host cluster also perform load balancing across the hosts for virtual machines deployed on the host cluster. Commercial products such as VMWare VMotion provides the capability of live migration of running a virtual machine from one host to another host without having downtime. (Note: the term(s) "VMWARE" and/or "VMOTION" may be subject to trademark rights in various jurisdictions throughout the world and are used here only in reference to the products or services properly denominated by the marks to the extent that such trademark rights may exist.) The migration is transparent to applications installed on the virtual machine and load balancing can be achieved with transaction integrity at VM level. The system uses internal protocols to manage access to the volumes and ensure consistency of the data. Traditionally, the volumes are attached to all the hosts in the host cluster to provide uninterrupted storage access during and after the VM migration.

The hypervisor software takes care of I/O forwarding and copying the virtual machine files from the older location to the new location in the host cluster and provides better management for all the VMs installed on the clustered host system.

NVMe protocol can support around 65,000 I/O queues that can be assigned to different processor cores to achieve parallelism. The I/O queues can be created based on host's (or Host Cluster's) requirement. When the admin queue is created I/O queues are created by sending instructions through the admin queue according to the host capabilities and requirements. The initiator can create I/O queues any time according to the requirements of the storage target. The storage target algorithm binds these I/O queues to CPU cores and the I/O submitted to the queue is served by the assigned CPU core.

For host-clustered hypervisor systems, multiple hosts are connected to each other to create a host-level clustered system collectively managed as a grouped entity. Multiple virtual machines can be installed on the host cluster that accesses hypervisor resources and shares a common pool of resources across the hypervisor system.

At the storage system level, the host clusters are defined as a cluster of host objects with more than one host identifiers (NQNs, IQNs, or host WWPNs). Physical hosts are treated as a single entity at the storage layer to support the host clustering and host level high availability (HA). According to some storage systems, virtual storage disks are mapped to a host cluster to be shared across all the hosts in the host cluster. This arrangement enables a customer to deploy a host level-HA in their datacenters. The storage systems are connected to the host cluster via means of SCSI or NVMe-oF protocol that provides volumes to the hypervisor and VMs. In these systems, each physical host running the hypervisor is connected to all the NVMe-oF subsystems that are present at the storage system level. The volumes accessed by the host cluster and VMs are exposed from NVMe-oF subsystem and serve the application I/Os from the storage system.

Figure 2:
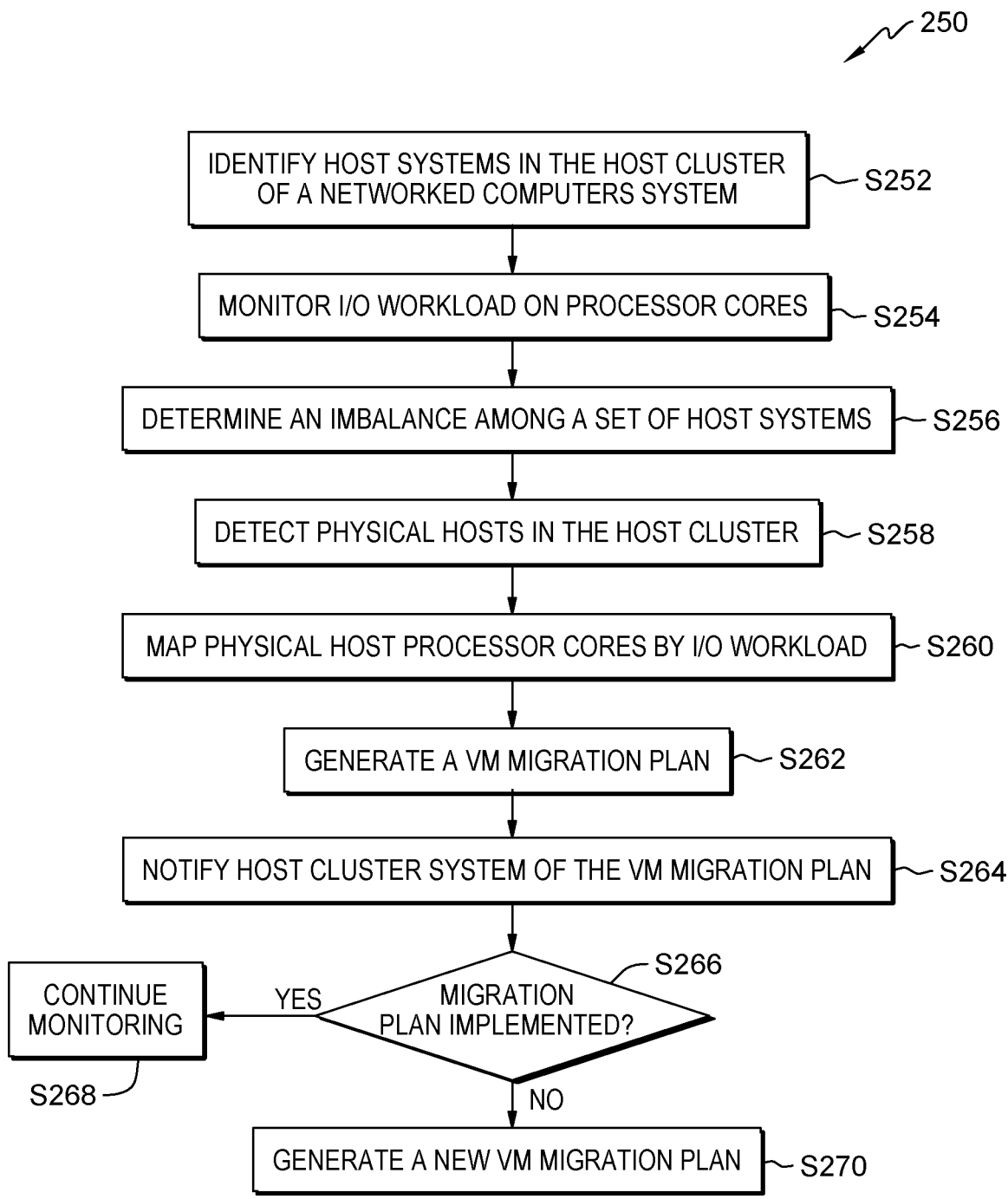
FIG. 2 is a flowchart showing a method performed, at least in part, by the first embodiment system.
Figure 3:
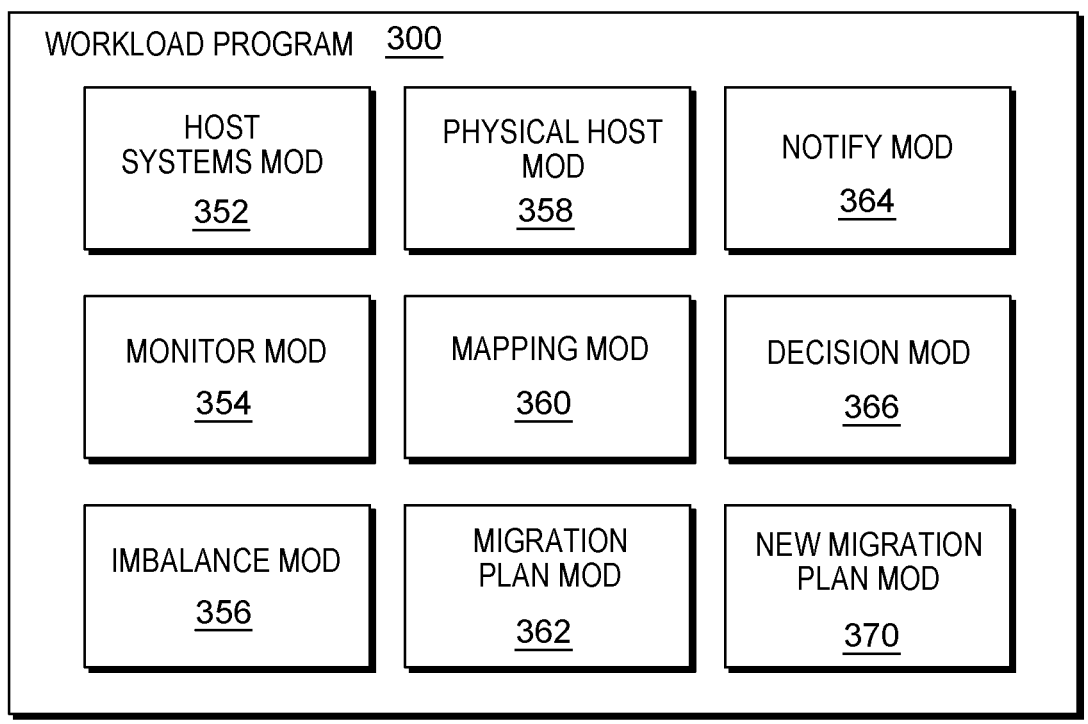
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S252, where host systems module ("mod") 352 identifies host systems in the host cluster of a networked computers system. In this example, the host systems 109 and 111 of host cluster sub-system 110 are identified within networked computers system 100. In some embodiments of the present invention, the host system mod collected information from the virtualization configuration object store for host clusters in the storage target system.

Processing proceeds to step S254, where monitor mod 354 monitors I/O workloads on processor cores. Processes performed by the I/O queues for each processor core of the NVMe-oF target system are monitored for overloading and/or underutilization of CPU cores.

Processing proceeds to step S256, where imbalance mod 356 determines an imbalance among a set of host systems. The data collected by monitor mod 354 in step S254 facilitates determination of an imbalance among the set of host systems. In this example, host 109 and host 111 participate in host cluster 110. The monitoring activity demonstrates an imbalance between the two hosts. Some embodiments of the present invention detect a CPU core imbalance based on the cumulative consumption percentage.

Processing proceeds to step S258, where physical host mod 358 detects the physical hosts in the host cluster. In this example, the physical hosts (not shown) are detected for hosts 109 and 111. When a CPU core imbalance is detected, the I/O queues connected to the CPU cores are identified. The identified I/O queues are analyzed for TOPS workloads and other workloads demanding less resources than TOPS workloads. Because the TOPS workloads can demand resource from the CPU, the consumption information is gathered and mapped according to individual host of the host cluster, such as hosts 109 and 111.

Processing proceeds to step S260, where mapping mod 360 maps physical host to processor cores according to I/O workload. Mapping the processor cores by workload provides for tracking which processor cores are performing high volumes of TOPS workloads and which cores are processing other types of workloads. Detection of physical hosts that may contribute to balancing workloads can be accomplished using host-cluster object parsing from configuration data and mapping queue-core pairs. Mapping the physical host processor to I/O queues of the various processor cores facilitates identification of target I/O queues belonging to the same host cluster so that load balancing is possible. When the target I/O queues are identified, some embodiments of the present invention collect a set of associated workloads and a measure of processor core consumption for each target I/O queue and corresponding processor cores.

Processing proceeds to step S262, where migration plan mod 362 generates a virtual machine (VM) migration plan. The migration plan proposes the migration of a VM from one hypervisor of one host to another hypervisor of another host. A proposal to migrate a VM is based on which host is generating more I/O workload and the mapped cores processing the I/O workload. Migration is proposed when cores that are underutilized and cores that are overloaded are mapped to physical hosts associated with a same host cluster such that migration between the two cores restores balance within the host cluster.

Processing proceeds to step S264, where notify mod 364 notifies the host cluster system of the virtual machine migration plan created in step S262. Some embodiments of the present invention notify the host cluster via advanced error reporting (AER) messages. Some embodiments of the present invention send an asynchronous notification to the physical host that will control and/or authorize the migration event.

Processing proceeds to decision step S266, where decision mod 366 determines whether or not the host cluster system implemented the VM migration plan. If the VM migration plan is implemented, processing follows the "yes" branch to step S268, where monitor mod 354 continues monitoring as described in step S254. If the VM migration plan is not implemented within a particular timeframe, processing follows the "no" branch to step S270.

Processing ends at step S270, where new migration mod 370 generates a new virtual machine migration plan.

Some embodiments of the present invention perform the operations that follow by hosts and target storage systems to avoid queue overlap from the same host. Target storage system continuously monitors for the CPU core utilization percentage for all the cores in the NVMe system using a demon that collects the information about the core and checks the core consumption for all the cores available. In a case where a certain number of cores are detected as overloaded and another set of cores are detected as under-utilized, the demon will send a signal to the NVMe driver indicating a correctable imbalance is identified. In some embodiments of the present invention, the signal is a CPU_IMBALANCE message. The overutilization and underutilization are detectable using threshold-based techniques. Upon receipt of the CPU_IMBALANCE message, or other signal from the monitoring demon, the I/O queues connected to the overloaded CPU core are analyzed and the I/O statistics are collected via data access maps that are maintained (for both BW (bandwidth workloads) and IOPS (input/output operations)).

For the detected IO queues (IOQ) responsible for the overloading the CPU core, each IOQ-to-host mapping is fetched from the configuration objects of storage system. Host cluster information for all these host objects are collected and their peer physical host identity is captured from the object maps using their Unique Identification (NQN or WWPNs, IQN, etc.). The IOQs connected by the peer physical hosts associated with the same host cluster are trapped and their associated workloads and related CPU core consumption is collected. Where the peer node IOQs associated with the CPU cores are only moderately or less loaded, the NVMe driver may move some of the virtual machine workload to another host within the host cluster to balance the core workload at the NVMe target subsystem. An advanced error reporting (AER) is generated identifying the source NQN with the target NQN (or IQN) information to move the VMs to the target host. Upon reception of the AER message, the NVMe driver of the host system decodes the target unique identifier (NQN, IQN, or WWNNs, etc.) and forwards the information to the host-clustering virtual machine manager.

When the VM migration proposal is received to the virtual machine manager, one of the below two decisions will be made. First, the VM manager can check the migration policy for the defined source and target and select a suitable VM to migrate to the selected peer physical host. For example, an acknowledgement is sent to the target with an acceptance message. The VM is selected and migrated to the selected peer host. A completion message is sent to the storage target by way of the admin queue. Or, second, the VM manager can reject the VM migration message and maintains the migration policy. For example, the VM manager checks the migration policy for source and target and if the identified VMs cannot be migrated according to the VM migration message, that is, to the suggested target, then a reject message is sent to the storage controller. Upon receipt of the reject message, the NVMe driver of the target system identifies another host cluster to shift the workload with an AER to balance the workloads.

Figure 4:
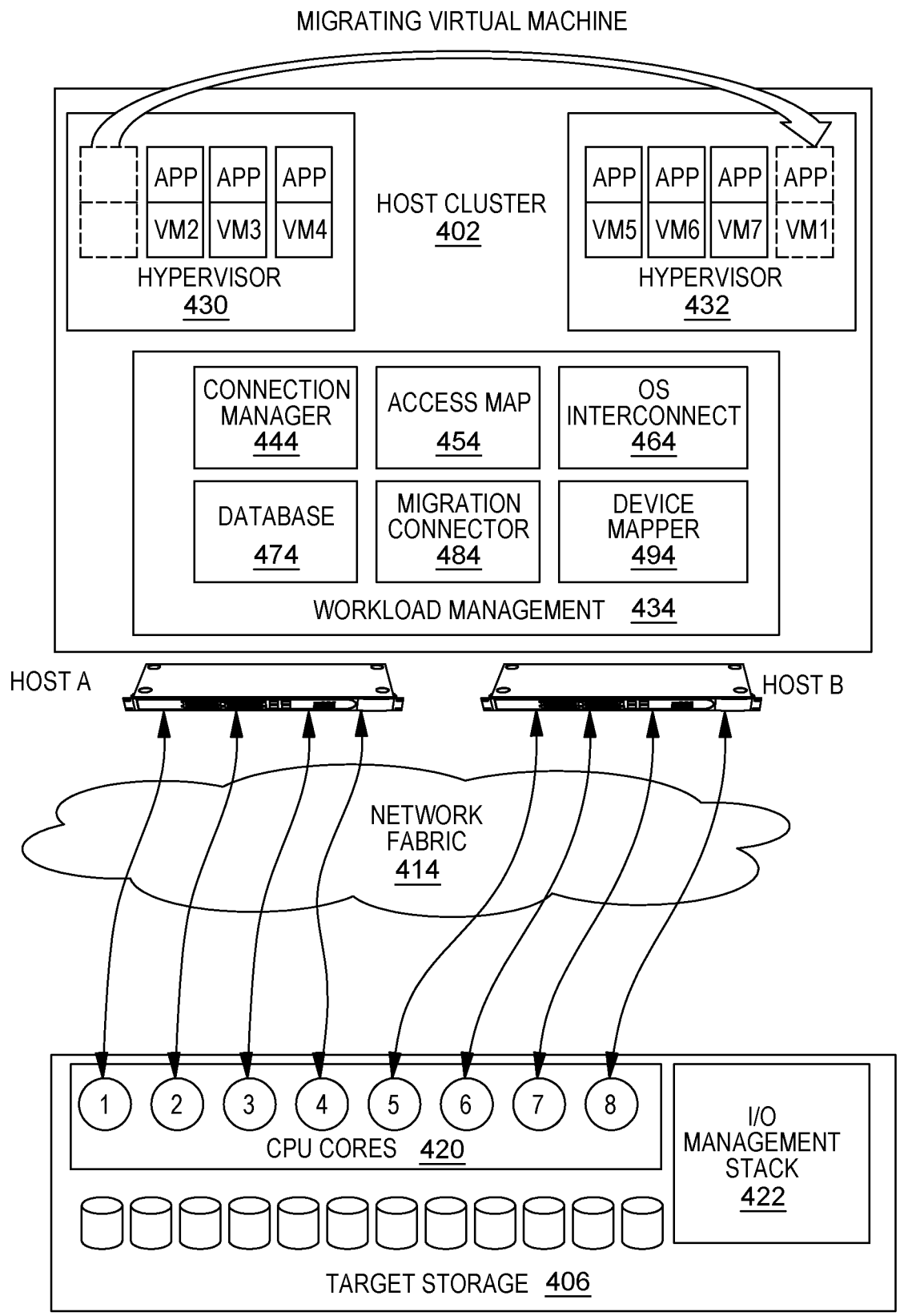
FIG. 4 is a block diagram view of a second embodiment of a system according to the present invention.

Further embodiments of the present invention are discussed in the paragraphs that follow and with reference to FIG. 4.

An example of a problem addressed by some embodiments of the present invention follows. Two hosts, Host A and Host B, are combined to form a host cluster on which 10 VMs are installed. In this example, both hosts, A and B, need to be connected to the NVMe-oF storage subsystem to access the volumes exposed to VMs and the hypervisor. Because the two hosts are connected to the NVMe target subsystem, the I/O queues are created from the host servers to the CPU cores of the target storage system. If Host A has 5 VMs and Host B has 5 VMs wherein the VMs of Host A are actively generating target I/O commands and the VMs of Host B are used for local data processing, hence less I/O is generated by the VMs of Host B, then even if Host B has created the I/O queues to different CPU cores of the target storage system they are not able to use the different CPU cores effectively, thus limiting the performance of the host cluster as it balances the VMs based on CPU consumption at the host level. Accordingly, an overload of the CPU core of the target storage system is not able to be known to the host cluster. Further, as the I/O queues from Host B are created and the host cluster is not using the I/O queues effectively, the target storage system is underutilized and continues to consume NVMe IOQ memory resources. Consumption of memory resources in this way results in storage level resource underutilization. Hence, there is need to provide a way to consider the core overloading in the host clustering system to trigger distribution of VMs based on I/O workloads observed at the NVMe target level to mitigate the core level misbalancing which is addressed in this invention.

FIG. 4 shows a system diagram for computing environment 400 according to an embodiment of the present invention. A method based on the above example and the associated software will now be discussed.

Host A and Host B are connected to the NVMe Storage Subsystems 406 including I/O management stack 422 and CPU cores 420. The VMs installed on the host cluster access volumes over network fabric 414 using the I/O queues created from hosts to Target. If VM1, VM2, VM3, and VM4 of hypervisor 410 are determined to be heavily accessing the volume data with reference to a threshold level of accessing while the VM5, VM6, and VM7 of hypervisor 412 are determined to be accessing the storage data below the threshold amount. As the VMs that are resident on Host A (hypervisor 410) are accessing more storage data and generating more workload on the associated CPU cores, the CPU 1, 2, 3, and 4 will begin experiencing an overload situation and the application performance is impacted because of heavy workload on the CPU cores. On the other hand, the cores that are associated to Host B (hypervisor 212) are underutilized and can serve more I/O. This scenario establishes a performance imbalance in the overall system.

Some embodiments of the present invention are directed to a mechanism managed by workload manager 434 including connection manager 444, access map 454, interconnect 464, host database 474, migration connector 484, and device mapper 494 to suggest the VM migration in host clustered system based on the CPU core overloading detection by working a NVMe driver of a target storage system. When a CPU core imbalance is detected, the host clusters are notified to migrate the VMs based on articulated insights of the workload imbalance.

The system collects the information from the virtualization configuration object store for host clusters configured in the storage target system. The I/O workload on each core (CPU Cores 420) on NVMe storage system 406 is monitored to detect the overloading or underutilization of the CPU cores. In case the CPU imbalance is detected based on the cumulative consumption percentage, then the I/O queues (not shown) connected to the CPU cores are identified and analyzed for the their IOPS and BW oriented workloads. It should be noted that distinguishing between workload types supports a determination of which CPU cores are likely overloaded. The TOPS workload type is made up of smaller packet size, such as 512K, while the BW workload type involved larger-sized packets. As the TOPS workloads are more CPU sensitive than BW workloads, information is gathered and mapped with CPU consumption per host in the host cluster. The decision of overloading and underutilization can be performance based on threshold-based approach and NVMe driver is notified for the CPU overload condition. After performing this workloads access monitoring per I/O queue of host cluster for the overloaded CPU core, then the NVMe driver at the storage subsystem determines which workload on which processor core can be increased to gain the better performance. In this way, symmetric workload balancing of processing cores is achieved for the storage system.

The system further detects for the physical hosts that can contribute to the balancing activity. The physical hosts are detected using host-cluster object parsing from configuration and mapping their Queue-Core pairs. The physical hosts in the host clusters are examined for information about which host is generating more I/O workload. When identified, the associated host processing cores are mapped. For example. Host A is actively performing I/O operations. I/O queues from Host A are connected to cores 1, 2, 3, 4. However, Host-B is performing less I/O operations on the storage system and I/O queues are created to core 5, 6, 7 and 8. In this case, the NVMe driver at the storage target determines that Host A and Host B are part of the same host cluster (cluster 402) and the hosts are working together. If a workload of Host A is shifted to Host B, the CPU consumption at the target storage system 406 can be balanced and the performance of the host clusters will improve because the I/O operations will be handled by carefully assigned processing cores such that workload parallelism benefits the NVMe system. As shown in FIG. 4, moving virtual machine VM1 from hypervisor 430 of Host A to hypervisor 432 is transparent to user applications accessing the VMs. For example, the NVMe driver at the storage target will determine that if some VMs from Host-A are moved to Host-B, some of the CPU core overloading condition will be resolved.

Once the new VM migration suggestions are made by the NVMe driver, the information is sent to administrative control unit of the NVMe controller. The administrative control unit sends an asynchronous notification of the queue overlap situation either through internal communication or protocol level communication (NVMe Asynchronous Event Request Command) to the Host. The imbalanced workload identified by the storage controller through monitoring I/O queue traffic on each processor core is resolved by determining which cores are overloaded. After detection of overloaded cores and associated queues, the storage controller target sends an asynchronous notification (i.e. NVMe Asynchronous Event Request command) to the server/host. The asynchronous notification includes the Host UUID (universally unique identifier) to which the VMs can be moved for better performance and overcome core overloading.

The Host UUID sent in the advanced error reporting (AER) message can be Host WWNNs in case of NVMe-oF or it can be host IQN in case of NVMe over Ethernet subsystems, which is unique identifier of host objects. When the message is received by the host, the Host NVMe driver reads the VM migration suggestion by decoding the AER command (in case of out-of-bound API implementation, it could be the host understandable proprietary message). The AER message is supplied to the hypervisor operating system to take the further actions along with translated target host details.

The operation continues with the host cluster hypervisor determining whether or not to move the recommended VMs to another host as suggested by the NVMe storage system or to disregard the suggestions. Where the host hypervisor accepts the suggestion from the storage system by validation of internal migration polices, then virtual machines are migrated, as recommended, to the target location supplied by the storage device. The VMs for which the most TOPS are needed is migrated with the objective of improving host performance and leveraging workload parallelism benefits. As all the new I/Os from the migrated VMs will be served by previously underutilized processing core, straight I/O performance benefits are observed by the VMs. As the CPU core overloading concern is resolved, the VMs accessing the previously overloaded core also benefit from the improved performance.

In some cases the suggested migration or migration plan, is rejected including: (i) the hosts can handle the probable performance degrade; (ii) the total decrease in IOPs is within permissible limits of the host; and/or (iii) the suggested migration does not fit into the host-level policies (HA or DR policies. The information of the rejected migration is transmitted to the storage controller. When the storage system determines that the host cluster is not able to move the VMs to the suggested hosts, the storage controller will send a signal to another host cluster to shift the I/O workload (if connected to the overloaded cores). Thus, allowing for moving the workloads in a balanced way and avoiding mass workload changes creating again an overloading situation.

Communication between NVMe queue manager and host cluster notifier can be via out-of-band protocol using out-of-band APIs implemented that possess capability to communicate between hosts and the storage controller clustered system. Alternatively, in case both of the systems are capable of in-band communication using NVMe standards, then the imbalance information and actuator signals are passed as part of protocol frames programmatically.

Some embodiments of the present invention are directed to data storage systems communicating with clustered host processing systems using NVMe (non-volatile memory express) protocols and providing for balancing I/O queue processing resources. Processor resources and memory resources in a target storage system are allocated when a command is received from the host cluster, also referred to as the initiator, to establish a I/O queue pair. information collected in the configuration maps and tables is analyzed to determine when target storage system processor resources are overloaded and/or under-utilized. The host cluster system is notified of a recommended rebalancing of the host processors within the clusters to distribute the workload more evenly in the I/O queue pairs and the corresponding processor and memory resources in the target storage system.

Some embodiments of the present invention are directed to identifying load imbalances by detecting overlapping I/O queues in core assignments within a NVMe storage controller using a monitoring demon, and performing symmetric workload balancing of identified load imbalances to overcome performance degradation.

Some embodiments of the present invention are directed to a process where NVMe queues are created from host sub-systems to a target storage sub-system. The process including detecting by the storage system that a first set of CPU cores of the storage sub-system are overloaded with queues of a first host sub-system that belongs to the host cluster. There are other host sub-systems in the host cluster that are generating less I/O data, causing an underutilization of a second set of CPU cores of the storage sub-system. Upon detecting the imbalance, the process proceeds to prepare and send an AER to the host cluster. Responsive to the AER message regarding the detected imbalance a proposed virtual machine migration is implemented to migrate a virtual machine from another host-subsystem to the first host sub-system. When the migration is complete, a acknowledgement message is sent to the storage sub-system using an admin queue of the NVMe target storage sub-system. The result of this process is that all of the CPU cores are receiving balances I/O data and none of the CPU cores are overloaded and the host application performs better than when the cores were overloaded.

Some embodiments of the present invention may include one, or more, of the following features, characteristics and/or advantages: (i) distributing VMs based on observed I/O workloads mitigates misbalancing of workloads at the CPU core level; (ii) reduced CPU core-level bottleneck; (iii) migrating VMs balances the CPU core TOPS workload to improve performance; (iv) reduces the host cluster I/O turnaround time with VM migration; (v) I/O queues are not disconnected from storage or host ends; (vi) only preference is modified by the host NVMe driver on the fly; (vii) is implemented easily with current storage system architecture; (viii) serves real-time problem solution for NVMe-based storage systems; (ix) enables optimal resource utilization for modern host clustered systems; (x) a complete solution to a larger environment or larger implementation like public and private cloud where a lot of host systems are clustered together and are attached to one or more storages; (xi) moves or migrates virtual machines within a clustered computing environment; and (xii) avoids recreating IOQs.

Some embodiments of the present invention are directed to a computer-implemented method for balancing I/O queue processing resources in a data storage system communicating with a clustered host processing system, the method comprising: monitoring utilization percentage of a set of processor cores in a non-volatile memory host controller interface (NVMe); responsive to detecting a threshold number of overloaded processor cores and identifying underutilized processor cores in the set of processor cores, sending an imbalance signal to an NVMe driver; collecting workload information from each I/O queue connected to the overloaded processor cores; identifying a set of I/O queues causing an overload condition for the overloaded processor cores; determining a mapping scheme for each of the set of I/O queues, the host mapping including identities of peer physical host; determining cluster information for the host objects of the cluster host processing system including corresponding peer physical host identity; collecting workload and related CPU core consumption for a set of peer host I/O queues, the peer host I/O queues belonging to the same host clusters being trapped; identifying certain peer nodes of the peer physical host having a set of node I/O queues connected to a processor core loaded below a threshold amount; selecting a set of overloaded I/O queues from the set of I/O queues for transfer of corresponding workload to the peer physical host; and transferring a first workload of an overloaded I/O queue to a VM of the peer physical host for processing.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for balancing input/output (I/O) queue processing resources of a data storage system communicating with a clustered host processing system using non-volatile memory express (NVMe) protocols, the method comprising:
    detecting an imbalance condition among a set of processor cores of a data storage system;
    identifying a set of overloaded processor cores;
    determining a set of I/O queues of the overloaded processor cores causing the imbalance condition;
    identifying for each I/O queue in the set of I/O queues a corresponding host and a peer physical host based on configuration maps and tables;
    identifying a set of target I/O queues, the set of target I/O queues associated with a peer physical host connected with a clustered host processing system;

collecting a set of associated workloads and a measure of processor core consumption for each target I/O queue and corresponding processor cores;

generating a virtual machine migration plan to balance the set of associated workloads within the clustered host processing system, the migration plan including moving a virtual machine from a first host connected to underutilized processor cores to a second host connected to overloaded processor cores; and causing the clustered host processing system to perform the virtual machine migration plan if a migration policy permits the migration.

2. The method of claim 1, further comprising:
establishing a set of NVMe queues including I/O queues from the clustered host processing system including the first host and the second host to the data storage system.

3. The method of claim 1, further comprising:
monitoring I/O workloads (IOPS) on the set of processor cores of the data storage system, the I/O workloads being distinguished from bandwidth workloads (BW).

4. The method of claim 1, further comprising
identifying a set of peer physical hosts of the clustered host processing system.

5. The method of claim 1, wherein the underutilized cores are defined as processor cores collecting relatively less I/O than the overloaded processor cores.

6. The method of claim 1, wherein detecting the imbalance is based on a threshold number of processor cores being overloaded.

7. The method of claim 1, further comprising:
responsive to determining the set of I/O queues of the overloaded processor cores causing the imbalance condition, generating an advanced error reporting message for the clustered host processing system.

8. A computer program product comprising a computer-readable storage medium having a set of instructions stored therein which, when executed by a processor, causes the processor to balance input/output (I/O) queue processing resources of a data storage system communicating with a clustered host processing system using non-volatile memory express (NVMe) protocols by:
detecting an imbalance condition among a set of processor cores of a data storage system;
identifying a set of overloaded processor cores;
determining a set of I/O queues of the overloaded processor cores causing the imbalance condition;
identifying for each I/O queue in the set of I/O queues a corresponding host and a peer physical host based on configuration maps and tables;
identifying a set of target I/O queues, the set of target I/O queues associated with a peer physical host connected with a clustered host processing system;
collecting a set of associated workloads and a measure of processor core consumption for each target I/O queue and corresponding processor cores;
generating a virtual machine migration plan to balance the set of associated workloads within the clustered host processing system, the migration plan including moving a virtual machine from a first host connected to underutilized processor cores to a second host connected to overloaded processor cores; and
causing the clustered host processing system to perform the virtual machine migration plan if a migration policy permits the migration.

9. The computer program product of claim 8, further causing the processor to balance I/O queue processing resources by:
establishing a set of NVMe queues including I/O queues from the clustered host processing system including the first host and the second host to the data storage system.

10. The computer program product of claim 8, further causing the processor to balance I/O queue processing resources by:
monitoring I/O workloads (IOPS) on the set of processor cores of the data storage system, the I/O workloads being distinguished from bandwidth workloads (BW).

11. The computer program product of claim 8, further causing the processor to balance I/O queue processing resources by:
identifying a set of peer physical hosts of the clustered host processing system.

12. The computer program product of claim 8, wherein the underutilized cores are defined as processor cores collecting relatively less I/O than the overloaded processor cores.

13. The computer program product of claim 8, wherein detecting the imbalance is based on a threshold number of processor cores being overloaded.

14. The computer program product of claim 8, further causing the processor to balance I/O queue processing resources by:
responsive to determining the set of I/O queues of the overloaded processor cores causing the imbalance condition, generating an advanced error reporting message for the clustered host processing system.

15. A computer system for balancing input/output (I/O) queue processing resources of a data storage system communicating with a clustered host processing system using non-volatile memory express (NVMe) protocols, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to balance I/O queue processing resources by:
detecting an imbalance condition among a set of processor cores of a data storage system;
identifying a set of overloaded processor cores;
determining a set of I/O queues of the overloaded processor cores causing the imbalance condition;
identifying for each I/O queue in the set of I/O queues a corresponding host and a peer physical host based on configuration maps and tables;
identifying a set of target I/O queues, the set of target I/O queues associated with a peer physical host connected with a clustered host processing system;
collecting a set of associated workloads and a measure of processor core consumption for each target I/O queue and corresponding processor cores;
generating a virtual machine migration plan to balance the set of associated workloads within the clustered host processing system, the migration plan including moving a virtual machine from a first host connected to underutilized processor cores to a second host connected to overloaded processor cores; and
causing the clustered host processing system to perform the virtual machine migration plan if a migration policy permits the migration.

16. The computer system of claim 15, further causing the processor to balance I/O queue processing resources by:

establishing a set of NVMe queues including I/O queues from the clustered host processing system including the first host and the second host to the data storage system.

17. The computer system of claim 15, further causing the processor to balance I/O queue processing resources by:
monitoring I/O workloads (IOPS) on the set of processor cores of the data storage system, the I/O workloads being distinguished from bandwidth workloads (BW).

18. The computer system of claim 15, further causing the processor to balance I/O queue processing resources by:
identifying a set of peer physical hosts of the clustered host processing system.

19. The computer system of claim 15, wherein the under-utilized cores are defined as processor cores collecting relatively less I/O than the overloaded processor cores.

20. The computer system of claim 15, wherein detecting the imbalance is based on a threshold number of processor cores being overloaded.

\* \* \* \* \*